(12) United States Patent
Chang (10) Patent No.: US 10,683,115 B2
(45) Date of Patent: Jun. 16, 2020

(54) PORTABLE AIR EXTRACTING DEVICE

(71) Applicant: Welcome Co., Ltd., New Taipei (TW)

(72) Inventor: Richard Chang, New Taipei (TW)

(73) Assignee: WELCOME CO., LTD., New Taipei (TW)

( * ) Notice: Subject to any disclaimer, the term of this patent is extended or adjusted under 35 U.S.C. 154(b) by 253 days.

(21) Appl. No.: 15/886,064

(22) Filed: Feb. 1, 2018

(65) Prior Publication Data

US 2019/0127098 A1    May 2, 2019

(30) Foreign Application Priority Data

Oct. 26, 2017   (TW) .............................. 106136846 A
Dec. 8, 2017    (TW) .............................. 106143219 A (51) Int. Cl.
| | | |
|---|---|---|
| B65B 31/04 | (2006.01) | |
| F04B 53/16 | (2006.01) | |
| F04B 35/06 | (2006.01) | |
| F04D 25/06 | (2006.01) | |
| F04D 17/16 | (2006.01) | |
| F04B 37/14 | (2006.01) | |
| F04D 29/70 | (2006.01) | |
| F04B 35/04 | (2006.01) | |
| A23L 3/00 | (2006.01) | |

(52) U.S. Cl.
CPC .............. *B65B 31/04* (2013.01); *F04B 35/04* (2013.01); *F04B 35/06* (2013.01); *F04B 37/14* (2013.01); *F04B 53/16* (2013.01); *F04D 17/168* (2013.01); *F04D 25/0673* (2013.01); *F04D 29/701* (2013.01); *A23L 3/00* (2013.01); *A23V 2002/00* (2013.01)

(58) Field of Classification Search
CPC .......... B65B 31/04; F04B 35/04; F04B 35/06; F04B 37/14; F04B 53/16; F04D 29/701; F04D 17/168; F04D 25/0673; A23L 3/00; A23V 2002/00
See application file for complete search history.

(56) References Cited

U.S. PATENT DOCUMENTS

| | | | | |
|---|---|---|---|---|
| 5,031,785 A * | 7/1991 | Lemme | ................. | B65B 31/047 141/65 |
| 5,765,608 A * | 6/1998 | Kristen | ................. | B65B 31/047 141/198 |
| 6,520,071 B1 * | 2/2003 | Lanza | ................... | B65B 31/047 141/198 |
| 7,096,893 B2 * | 8/2006 | Vilalta | ................. | B65B 31/047 141/65 |
| 7,127,875 B2 * | 10/2006 | Cheung | ................. | B65B 31/047 53/510 |
| 7,272,919 B2 * | 9/2007 | Cheung | ................. | B65B 31/047 53/510 |

(Continued)

*Primary Examiner* — Nicolas A Arnett
(74) *Attorney, Agent, or Firm* — Bacon & Thomas, PLLC (57) ABSTRACT

A portable air extracting device includes a shell assembly and an electric air extracting pump. The shell assembly includes a top shell, a side shell and a bottom shell surrounding a fluid room. The bottom shell is provided with an external air-extracting hole. The external air-extracting hole connects the fluid room to a target space to be evacuated. The electric air extracting pump includes an intake nozzle and an outtake nozzle. In particular, the intake nozzle is misaligned with the external air-extracting hole.

12 Claims, 10 Drawing Sheets

(56) References Cited

U.S. PATENT DOCUMENTS

| | | | | |
|---|---|---|---|---|
| 7,389,629 B2* | 6/2008 | Tretina | ................... | F04C 25/00 |
| | | | | 141/65 |
| 8,096,329 B2* | 1/2012 | Thuot | ................... | B65B 31/04 |
| | | | | 141/127 |
| 8,240,112 B2* | 8/2012 | Binger | ................... | F04B 9/047 |
| | | | | 417/415 |
| 8,740,591 B2* | 6/2014 | Blythe | ................... | F04B 33/00 |
| | | | | 417/555.1 |
| 2004/0177771 A1* | 9/2004 | Small | ................... | A23L 3/0155 |
| | | | | 99/472 |
| 2008/0279702 A1* | 11/2008 | Kim | ................ | B65B 31/02 |
| | | | | 417/413.1 |

* cited by examiner

PORTABLE AIR EXTRACTING DEVICE

BACKGROUND OF THE INVENTION

1. Field of the Invention

The present invention relates to a portable air extracting device.

2. Description of Related Art

In daily life, people usually need to evacuate the containers to prevent food, clothing or other items from spoilage or moldy. The storage volume of a soft item such as a cloth can be further reduced by putting it into a flexible container such as a bag which is then evacuated. Therefore, there is a demand for air extraction devices.

An air extraction device tends to have smaller size in term of portability, in particular for a traveler. However, a small size air extraction device lacks enough room to deal with steam and foreign matters. Besides, a small size air extraction device suffers heat dissipation problem. Therefore, it is desirable to provide an improved air extraction device to mitigate and/or obviate the aforementioned problems.

SUMMARY OF THE INVENTION

In order to solve the aforementioned problems, the present invention provides a portable air extracting device including a shell assembly and an electric air extracting pump. The shell assembly includes a top shell, a side shell and a bottom shell surrounding a fluid room. The bottom shell is provided with an external air-extracting hole connecting the fluid room to a target space to be evacuated. The electric air extracting pump includes an intake nozzle and an outtake nozzle. In particular, the intake nozzle is misaligned with the external air-extracting hole.

Herein, since the intake nozzle of the present invention is misaligned with the external air-extracting hole, steam or foreign matters will not be inhaled directly into the electric air extracting through the pump intake nozzle. Therefore, the electric air extracting pump can be protected from damages caused by the steam or the foreign matters.

Furthermore, the intake nozzle may have an intake nozzle channel, the external air-extracting hole may have an external air-extracting hole channel, and there may be no imaginary line passing through both of the intake nozzle channel and the air extraction hole channel. Furthermore, the bottom shell may have a center point, and the intake nozzle may be aligned with the center point, while the external air-extracting hole may be misaligned with the center point; alternatively, the external air-extracting hole may be aligned with the center point, while the intake nozzle may be misaligned with the center point.

Furthermore, the shell assembly may further include a spacer dividing the fluid room into an intake room and an outtake room, the intake nozzle may be connected to the intake room, the outtake nozzle may be connected to the outtake room, and the external air-extracting hole may connect the intake room to the target space to be evacuated. Furthermore, the spacer may further include an internal air-extracting hole connecting the intake nozzle to the intake room.

Herein, the spacer isolates the intake room from the outtake room to avoid the air from flowing back to the intake room after the electric air extracting pump has pumped the air from the intake room to the outtake room.

Furthermore, the portable air extracting device of the present invention may further include an internal airtight element arranged between the spacer and the intake nozzle, and an external airtight element arranged between the spacer and the bottom shell. Furthermore, the internal airtight element may be hitched on the intake nozzle. Furthermore, the side shell may include a first side shell and second side shell, and the spacer may be integrated with the first side shell, or the spacer may be integrated with the second side shell.

Herein, the internal airtight element and the external airtight element completely isolate the intake room from the outtake room to avoid the air from flowing back to the intake room through the seams near the spacer, after the electric air extracting pump has pumped the air from the intake room to the outtake room.

Furthermore, spacer may include an air buffer room connected to the outtake room, and the outtake nozzle may be aligned with the air buffer room.

Herein, the air buffer room provides enough buffer room for the air to flow out of the outtake nozzle into the outtake room.

Furthermore, the outtake room may surround the electric air extracting pump.

Herein, the air flowing out of the outtake nozzle into the outtake room will diffuse, flow or circulate in the outtake room and thus cool the electric air extracting pump down, thereby improving heat dissipation.

Other objects, advantages, and novel features of the invention will become more apparent from the following detailed description when taken in conjunction with the accompanying drawings.

DETAILED DESCRIPTION OF THE PREFERRED EMBODIMENT

First Embodiment

Figure 1:
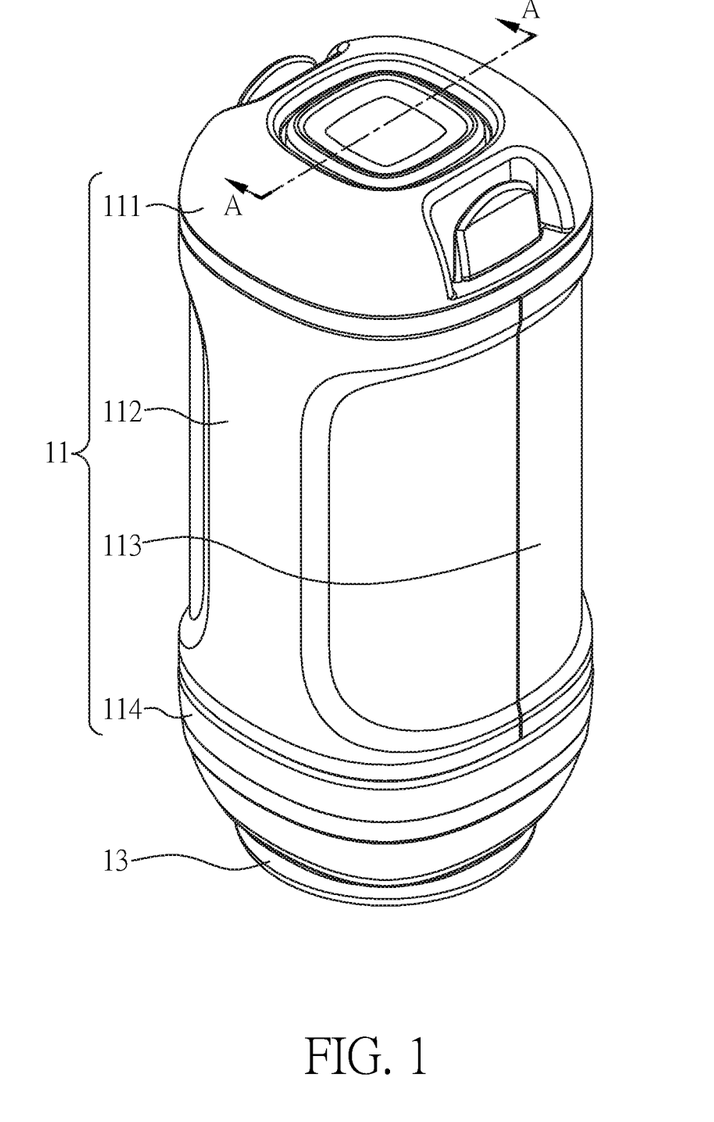
FIG. 1 is a perspective view of the portable air extracting device according to the first embodiment of the present invention.

FIGS. 1 to 4 are a perspective view, a sectional view along line A-A in FIG. 1, a top exploded view and a bottom exploded view of the portable air extracting device according to the first embodiment of the present invention, respectively.

The portable air extracting device according to the first embodiment of the present invention includes a shell assembly 11 and an electric air extracting pump 121. The shell assembly includes a top shell 111, a side shell 112 and/or 113, and a bottom shell 114, which surround a fluid room S1 and/or S2.

Optionally, the side shell 112 and/or 113 may be divided into a first side shell 112 and a second side shell 113.

Figure 2:
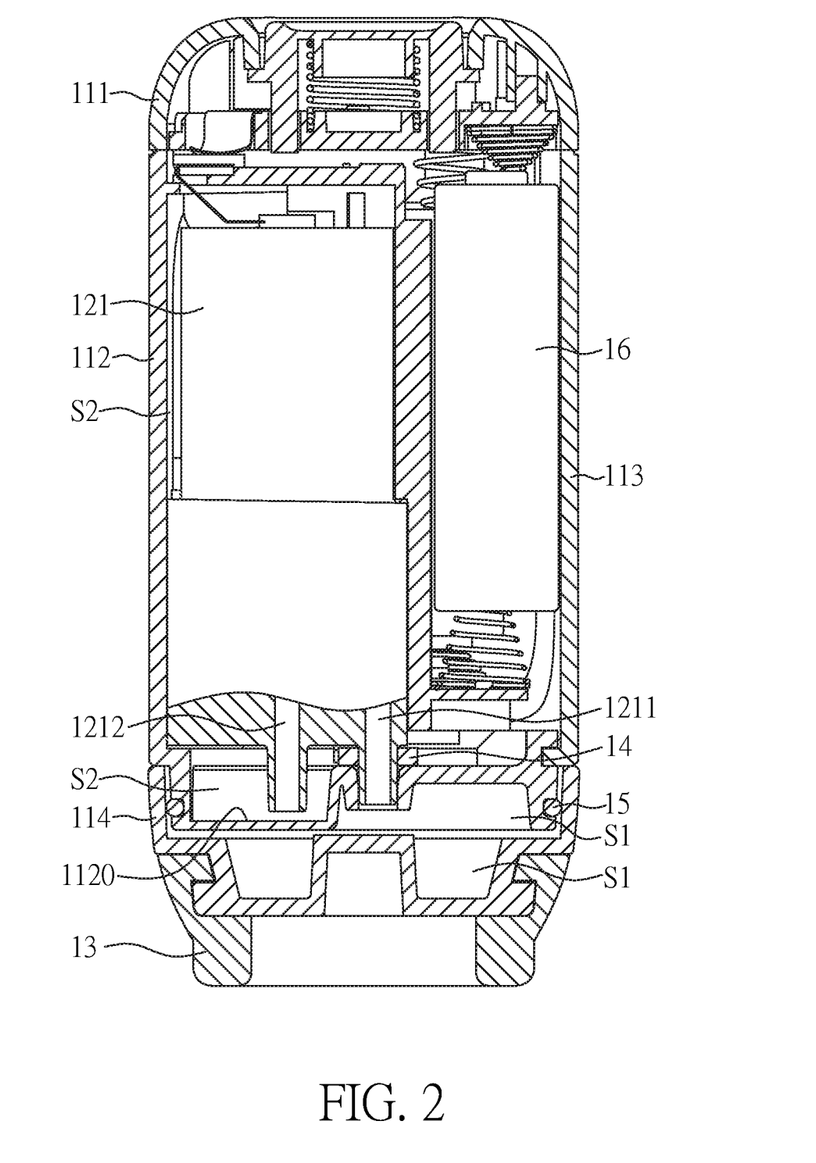
FIG. 2 is a sectional view along line A-A in FIG. 1.

Optionally, the fluid room S1 and/or S2 may be divided into an intake room S1 and an outtake room S2 by a spacer 1120, as shown in FIG. 2. Herein, the spacer 1120 isolates the intake room S1 from the outtake room S2 to avoid the air from flowing back to the intake room S1, after the electric air extracting pump 121 has pumped the air from the intake room S1 to the outtake room S2. However, the isolation between the intake room S1 and the outtake room S2 may not be necessary when the inhalation flow rate (or velocity) is larger than the backflow flow rate (or velocity), for example, when the outtake room. S2 is far away from the intake room S1, for example, when both rooms are in the opposite sides of the electric air extracting pump 121.

The electric air extracting pump 121 includes an intake nozzle 1211 and an outtake nozzle 1212. The intake nozzle 1211 is connected to the intake room S1, and the outtake nozzle 1212 is connected to the outtake room S2.

Figure 3:
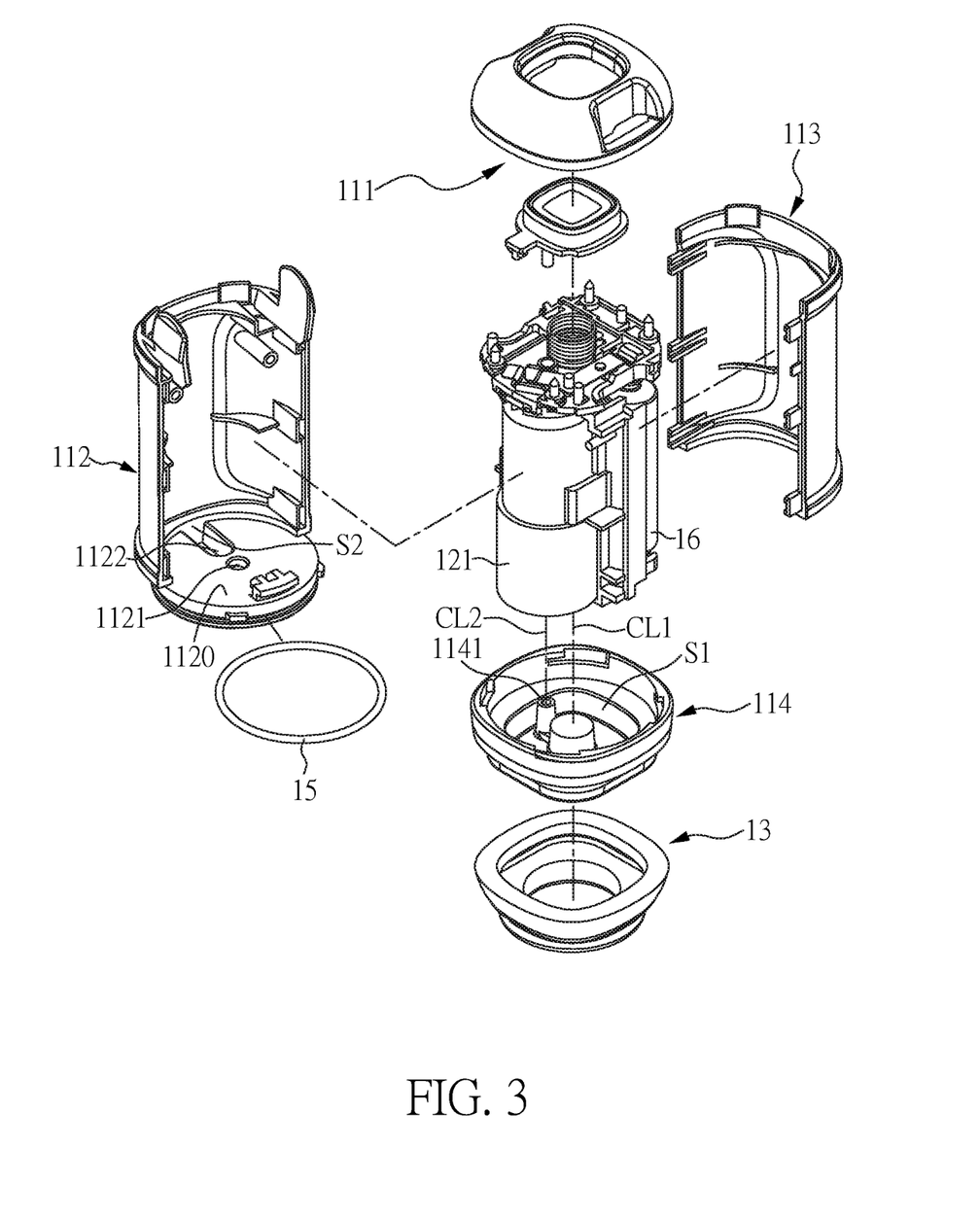
FIG. 3 is a top exploded view of the portable air extracting device according to the first embodiment of the present invention.
Figure 4:
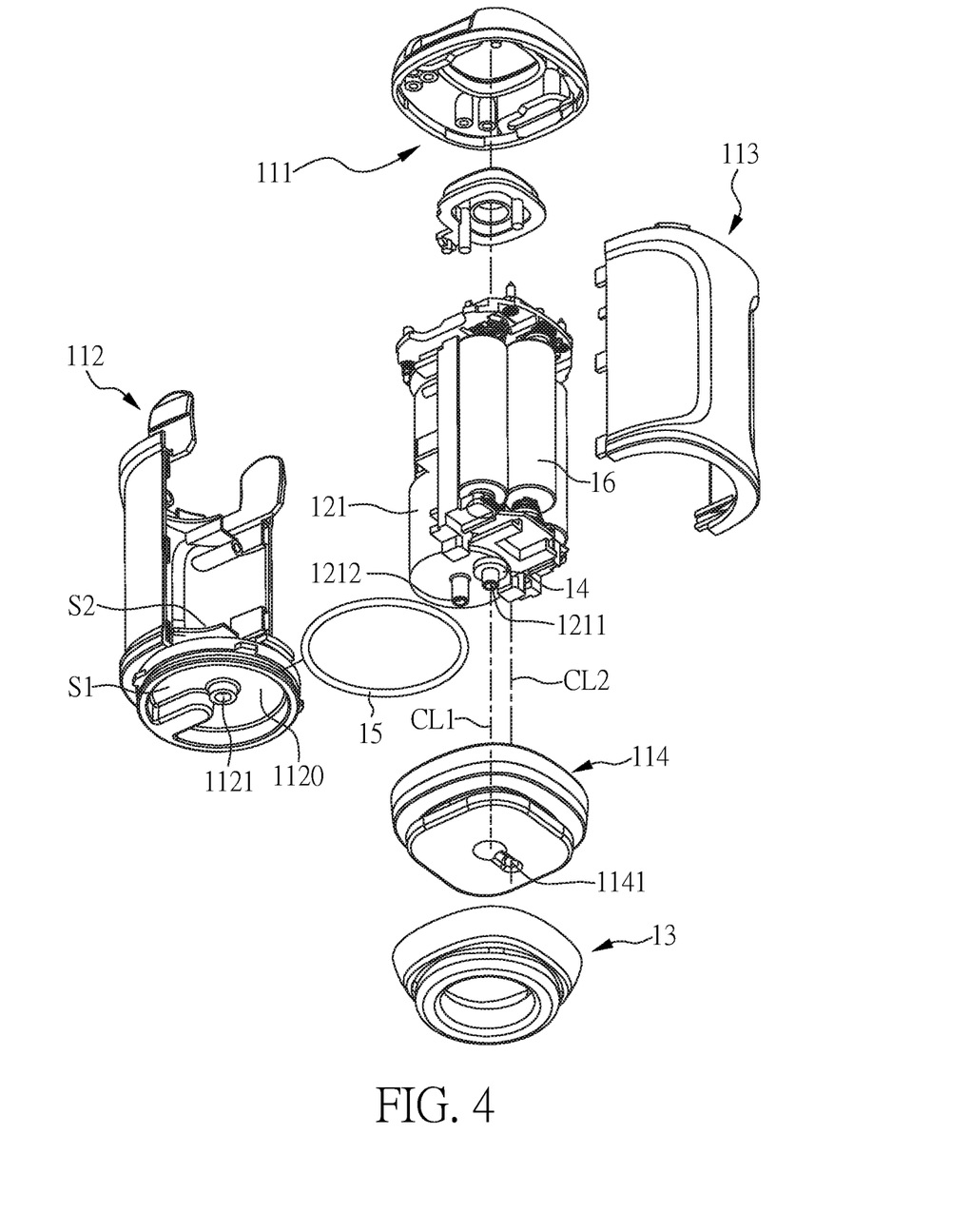
FIG. 4 is a bottom exploded view of the portable air extracting device according to the first embodiment of the present invention.
Figure 5:
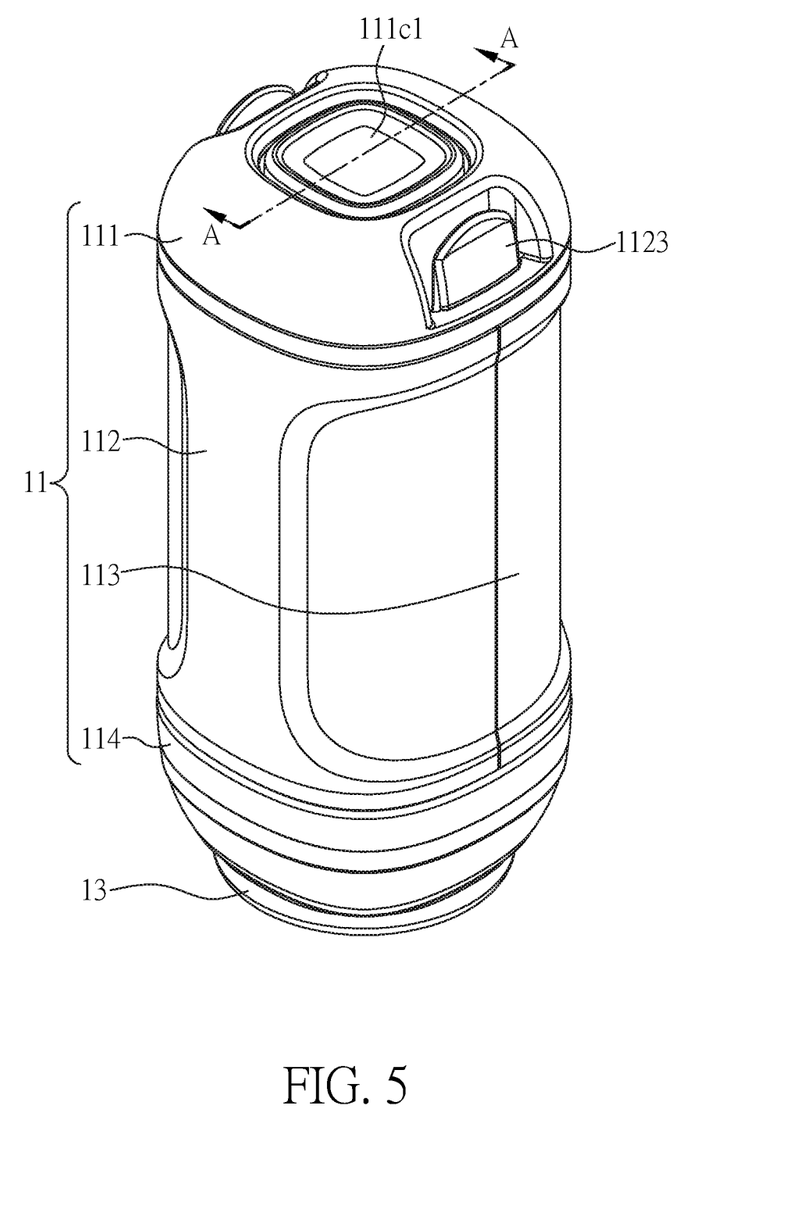
FIG. 5 is a perspective view of the portable air extracting device according to the second embodiment of the present invention.

Referring especially to FIGS. 3 and 4, the bottom shell 114 is provided with an external air-extracting hole 1141. The external air-extracting hole 1141 connects the intake room S1 of the fluid room S1 and/or S2 to a target space to be evacuated. The target space to be evacuated may be a bag or other containers.

The operation of the portable air extracting device of the present invention will be discussed in the following description.

During air extraction, the intake nozzle 1211 will inhale the air in the intake room. S1 into the electric air extracting pump 121. Then, because of the lowered air pressure in the intake room S1, the air will flow from the target space to be evacuated into the intake room S1 through the external air-extracting hole 1141, and then be inhaled into the electric air extracting pump 121 through the intake nozzle 1211. In this way, a vacuum can be created in the target space to be evacuated. It is noted that the existence of the intake room S1 and the misalignment between the intake nozzle 1211 and the external air-extracting hole 1141 realize a spatially segmented air extraction.

The air inhaled into the electric air extracting pump 121 is exhaled into the outtake room S2 through the outtake nozzle 1212. The outtake room S2 may be connected to the atmosphere. The shell assembly 11 may has seams that allows the air in the outtake room S2 to escape to the atmosphere. Of course, it is possible to form on the shell assembly 11 an opening that allows the air to escape. However, in order to avoid the air extraction efficiency from being reduced by inhalation of the air from a space other than the target space to be evacuated, the portion surrounding the intake room S1 of the shell assembly 11, for example, the bottom shell 114, should not have any seam.

(The Misalignment Between the Intake Nozzle and the External Air-Extracting Hole)

Referring especially to FIGS. 3 and 4, it is noted that in the portable air extracting device of the present invention, the intake nozzle 1211 is misaligned with external air-extracting hole 1141. In particular, the intake nozzle 1211 has an intake nozzle channel, and the external air-extracting hole 1141 has an external air-extracting hole channel, and there is no imaginary line passing through both of the intake nozzle channel and the air extraction hole channel. As shown in FIGS. 3 and 4, the axis (or line) CL1 which passes through the intake nozzle 1211 is different from the axis (or line) CL2 which passes through the external air-extracting hole 1141. In this embodiment, the intake nozzle 1211 is aligned with the center point of the bottom shell 114, while the external air-extracting hole 1141 is misaligned with the center point of the bottom shell 11. Accordingly, a misalignment is realized between the intake nozzle 1211 and the external air-extracting hole. It is also possible to consider the case where the external air-extracting hole 1141 is aligned with the center point of the bottom shell 114, while the intake nozzle 1211 is misaligned with the center point of the bottom shell 1141. Of course, other arrangement is also possible as long as the intake nozzle 1211 is misaligned with the external air-extracting hole 1141.

In this way, steam or foreign matters will not be inhaled directly into the electric air extracting pump 121 through intake nozzle 1211, and will stay in the intake room S1. Therefore, the electric air extracting pump 121 can be protected from damages caused by the steam or foreign matters. A filter or sorptive materials may be introduced in the intake room S1 to force the steam or foreign matters to stay therein.

It is appreciated that the present invention provides a convenient solution for a small size air extraction device which lacks enough buffer room to deal with steam and foreign matters in prior art.

(The Features and the Effects of the Spacer and the Peripheral Elements Thereof in Respect of Air Extraction)

The features and the effects of the spacer 1120 and the peripheral elements thereof in respect of air extraction will be discussed in the following description.

As discussed above, the spacer 1120 is mainly used to divide the fluid room S1 and/or S2 into the intake room S1 and the outtake room S2, and further to isolate the intake room S1 from outtake room S2 to avoid the air from flowing back to the intake room S1, after the electric air extracting pump 121 has pumped the air from the intake room S1 to the outtake room S2.

In FIG. 2, the intake room S1 is located in the bottom-right of the spacer 1120, and the outtake room S2 is located in the top-left of the spacer 1120. In respect to their relative positions, the intake room S1 is located under the bottom surface of the spacer 1120, and the outtake room S2 is located on the top surface of the spacer 1120.

As shown in FIGS. 3 and 4, the spacer 1120 has a disk shape. Of course, it may have other shapes according to the shape of, in particular of the section, of the shell assembly 11. Furthermore, the spacer 1120 is integrated with the first side shell 112. Of course, it is also possible to consider the case where the spacer 1120 is integrated with the second side shell 113.

The spacer 1120 includes an internal air-extracting hole 1121 aligned with the intake nozzle 1211, and thus connecting the intake nozzle 1211 to the intake room S1. The intake nozzle 1211 may contact or even be inserted into the internal air-extracting hole 1121 to realize their connection.

Preferably, the internal airtight element 14 is arranged between the spacer 1120 and the intake nozzle 1211. Optionally, the internal airtight element 14 is hitched on the intake nozzle 1211 to provide the airtight function when the intake nozzle 1211 contacts or is inserted to the internal air-extracting hole 1121, thereby effectively isolating the intake room S1 from the outtake room S2.

Preferably, the external airtight element 15 is arranged between the spacer 1120 and the bottom shell 114.

Herein, the internal airtight element 14 and the external airtight element 15 completely isolate the intake room S1 from the outtake room S2 to avoid the air from flowing back to the intake room S1 through the seams of the shell assembly 11 near spacer 101, after the electric air extracting pump 121 has pumped from the intake room S1 to the outtake room S2, thereby improving the air extraction efficiency.

(The Features and the Effects of the Spacer and the Peripheral Elements Thereof in Respect of Exhalation)

The features and the effects of the spacer 1120 and the peripheral elements thereof in respect of exhalation will be discussed in the following description.

As shown in FIGS. 3 and 4, the spacer 1120 includes an air buffer room 1121. The outtake nozzle 1212 is aligned with the air buffer room 1121. The air buffer room 1121 is connected to the outtake room S2. Herein, the air buffer room 1122 provides enough buffer room for the air to flow out of the outtake nozzle 1212 into the outtake room S2.

Preferably, the outtake room S2 surrounds the electric air extracting pump 121. In this way, the air flowing out of the outtake nozzle 1212 into the outtake room S2 will diffuse, flow or circulate in the outtake room S2, and thus cool the electric air extracting pump 121 down, thereby improving heat dissipation. It is appreciated that the present invention provides a convenient solution to improve heat dissipation for a small size air extraction device.

Second Embodiment

FIGS. 5 to 10 are respectively a perspective view, a sectional view along line A-A in FIG. 1, a top exploded view, a bottom exploded view, a top assembly view, and a bottom assembly view of the portable air extracting device according to the second embodiment of the present invention.

The portable air extracting device of the present invention includes a shell assembly 11, an air extracting module 12, a suction element 13, an internal airtight element 14, an external airtight element 15 and three electric cells 16.

The shell assembly 11 includes a top shell 111, a first side shell 112, a second side shell 113 and a bottom shell 114 assembled with each other by buckle or snap-fit. The top shell 111, the first side shell 112, the second side shell 113 and the bottom shell 114 surround a fluid room S1 and/or S2. In particular, the intake room S1 of the fluid room S1 and/or S2 is surrounded by the first side shell 112, the second side shell 113 and the bottom shell 114, and the outtake room S2 of the fluid room S1 and/or S2 is surrounded by the first side shell 112, the second side shell 113 and the top shell 113.

The top shell 111 includes a cover 111a, a substrate 111b and a switch 111c. The cover 111a and the switch 111c are arranged on the substrate 111b. The cover 111a includes two grooves 111a1 and an opening 111a2. The switch 111c includes a button 111c1 with a contactor 111c2, a spring 111c3 arranged corresponding to the button 111c1, an electrode 111c4 and a first conductive point E1.

The first side shell 112 includes a spacer 1120, two first tongues 1123, six first slots 1124, two second slots 1125 and four second tongues 1126. The two first tongues 1123 are buckled into the two grooves 111a1 respectively. The spacer 1120 is provided with an internal air-extracting hole 1121 and an air buffer room 1122.

The second side shell 113 includes six bolts 1131. The six bolts 1131 are inserted into the six first slots 1124, respectively.

The bottom shell 114 includes an external air-extracting hole 1141, four snap-fit grooves 1142 and a head 1143. The external air-extracting hole 1141 connects the intake room S1 to the target space to be evacuated, such as a bag or other containers. The four second tongues 1126 are buckled into the four snap-fit grooves 1142, respectively.

The air extracting module 12 is arranged in the shell assembly 11, which in turn includes an electric air extracting pump 121 and an electric cell support 122. The electric air extracting pump 121 is arranged on one side of the electric cell support 122, and three electric cells 16 are arranged on another side of the electric cell support 122. Preferably, the electric air extracting pump 121 is parallel to the electric cell support 122 (and the three electric cell 16), and preferably also parallel to the shell assembly 11, along their longitudinal extension directions, so that the containing room of the shell assembly 11 can be effectively used. Optionally, the shell assembly 11 has a column shape, such as circular columns, elliptic columns, square columns or other polygonal columns. The sharp corners of the polygonal column can be smoothed to enhance safety, comfort and beauty.

The electric air extracting pump 121 includes an intake nozzle 1211, an outtake nozzle 1212 and a second conductive point E2. The intake nozzle 1211 is aligned with the internal air-extracting hole 1121 of the spacer 1120, and it may contact or even be inserted into the internal air-extracting hole 1121. The outtake nozzle 1212 is aligned with the air buffer room 1122 of the spacer 1120. The air buffer room 1122 provides enough buffer room for the air to flow out of the outtake nozzle 1212 into the outtake room S2.

The electric cell support 122 has two protrusions 1221 (only one protrusion 1221 is shown in the figure) being inserted into the two second slot 1125, respectively.

The internal airtight element 14 hitched on the intake nozzle 1211 of the electric air extracting pump 121 and the spacer 1120 arranged in the first side shell 112 can provide the airtight function, and effectively isolate the intake room S1 from the outtake room S2, thereby improving the air extraction efficiency.

The suction element 13 is detachably arranged on the bottom shell 114. The suction element 13 includes a suction opening 131 and a hitching groove 132. The suction opening 131 is connected to the external air-extracting hole 1141. The head 1143 of the bottom shell 114 is inserted into the hitching groove 132 of the suction element 13.

The suction element 13 is preferably made of flexible materials, such as rubber or silicone rubber. The suction element 13 is aligned with the air extraction opening of the container to be evacuated to provide the airtight function, and further to avoid the air extraction efficiency from being reduced by inhalation of the air from a space other than the container to be evacuated. In addition, the suction opening 131 of the suction element 13 can have a diameter D chosen for different types of the containers to be evacuated. The head 1143 of the bottom shell 114 is engaged with the hitching groove 132 of the suction element 13. The user may use different types of the suction elements 13 that may be detachably arranged on the bottom shell 114 in practical application.

(Operation)

Figure 6:
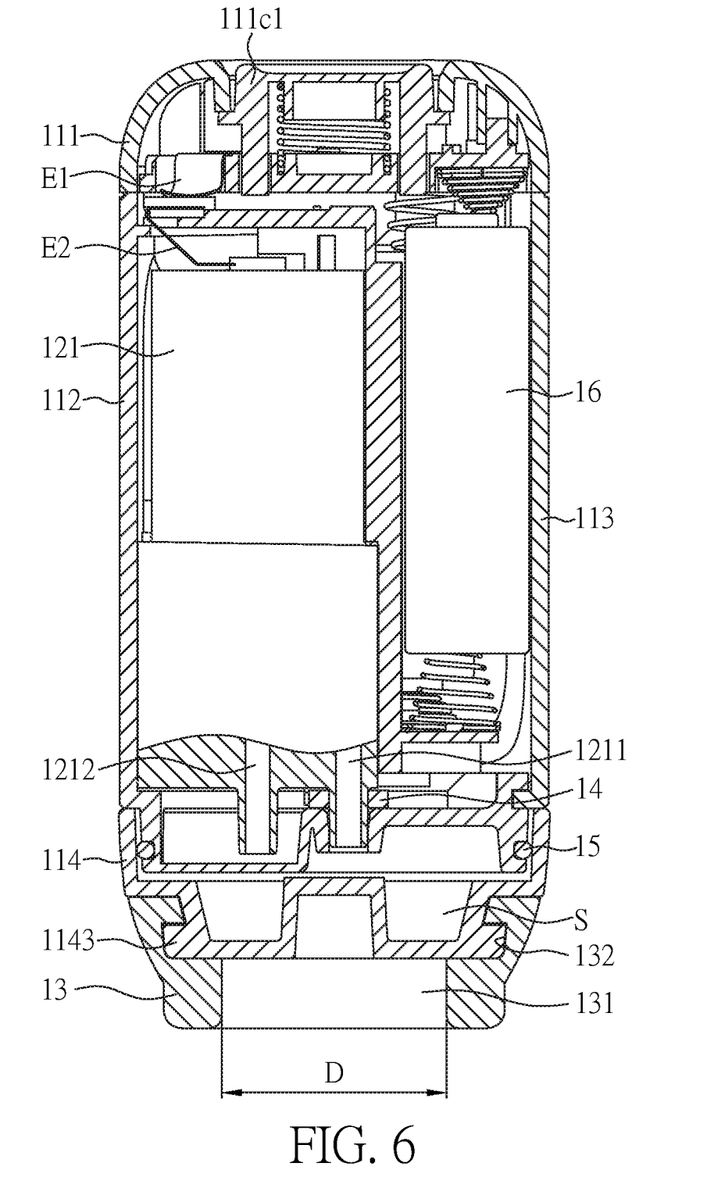
FIG. 6 is a sectional view along line A-A in FIG. 5.
Figure 7:
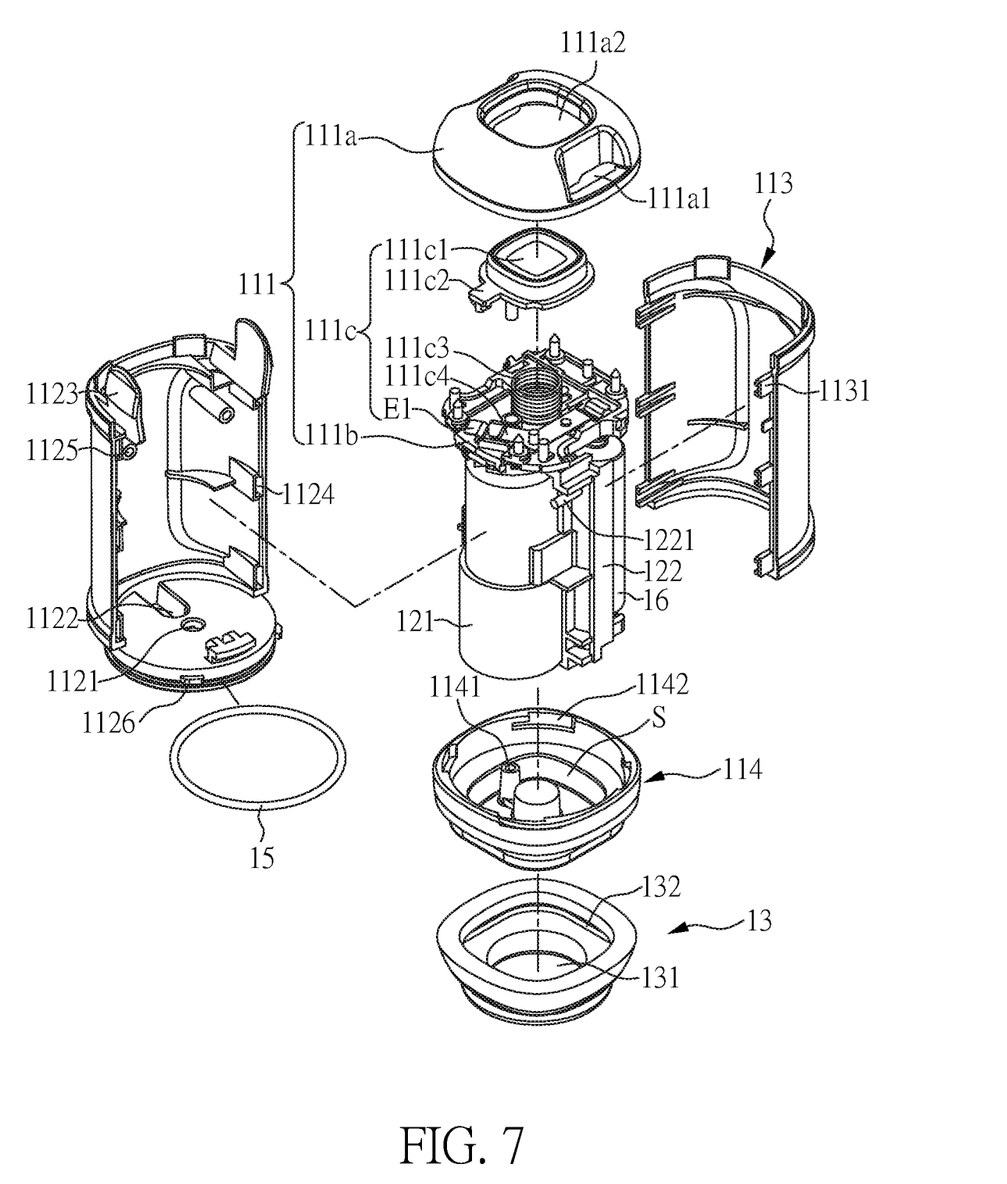
FIG. 7 is a top exploded view of the portable air extracting device according to the second embodiment of the present invention.

FIGS. 6 and 7 illustrate the operation of the portable air extracting device of the present invention.

When the user wants to start the air extraction, he may press the button 111c1. The contactor 111c2 will contact the first conductive point E1 and push it down. Until the first conductive point E1 contacts the second conductive point E2, the electric circuit will become a close loop, which can provide electric power to the electric air extracting pump 121 to start the air extraction.

When the user wants to stop the air extraction, he may stop pressing on the button 111c1. The spring 111c3 will push the button 111c1 up. When the first conductive point E1 leaves the second conductive point E2, the electric circuit will become an open loop, and the electric air extracting pump 121 will lose its electric power and stop the air extraction.

Referring to FIG. 7, during air extraction, the air buffer room 1122 provides enough buffer room for the air to flow out of the outtake nozzle 1212 into the outtake room S2. The outtake room S2 surrounds the electric air extracting pump 121. In this way the air flowing out of the outtake nozzle 1212 into the outtake room S2 will diffuse, flow or circulate in the outtake room S2, and thus cool down the electric air extracting pump 121, improving heat dissipation.

Figure 8:
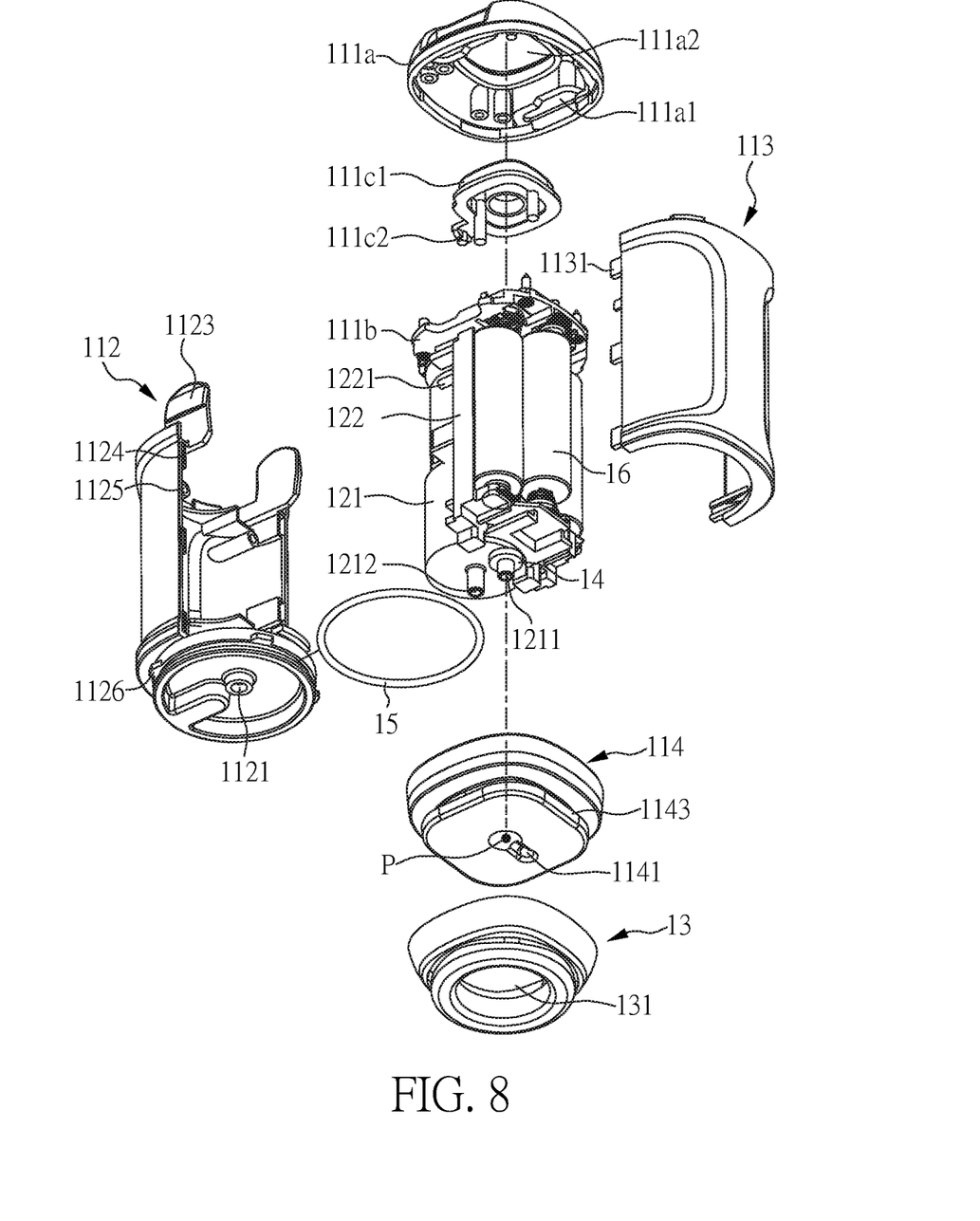
FIG. 8 is a bottom exploded view of the portable air extracting device according to the second embodiment of the present invention.

In addition, as shown in FIG. 8, the intake nozzle 1211 of the electric air extracting pump 121 is vertically (orthographically) projected to the projected point P located at the bottom surface of the bottom shell 1145, and the external air-extracting hole 1141 is formed shifted from the projected point P. In this way, steam or foreign matters may not be inhaled into the electric air extracting pump 121. In particular, the air in the container to be evacuated flows into the suction opening 131, then the external air-extracting hole 1141, and then into the intake room S1. Steam, dust, particles, debris and other foreign matters carried in the air may stay in the intake room S1, and may not be directly inhaled into and cause damage to the electric air extracting pump 121. It is also possible to introduce a filter or sorptive materials of electrostatic type or adherent type in the intake room S1 to force the steam or foreign matters to stay therein.

(Assembly)

Figure 9:
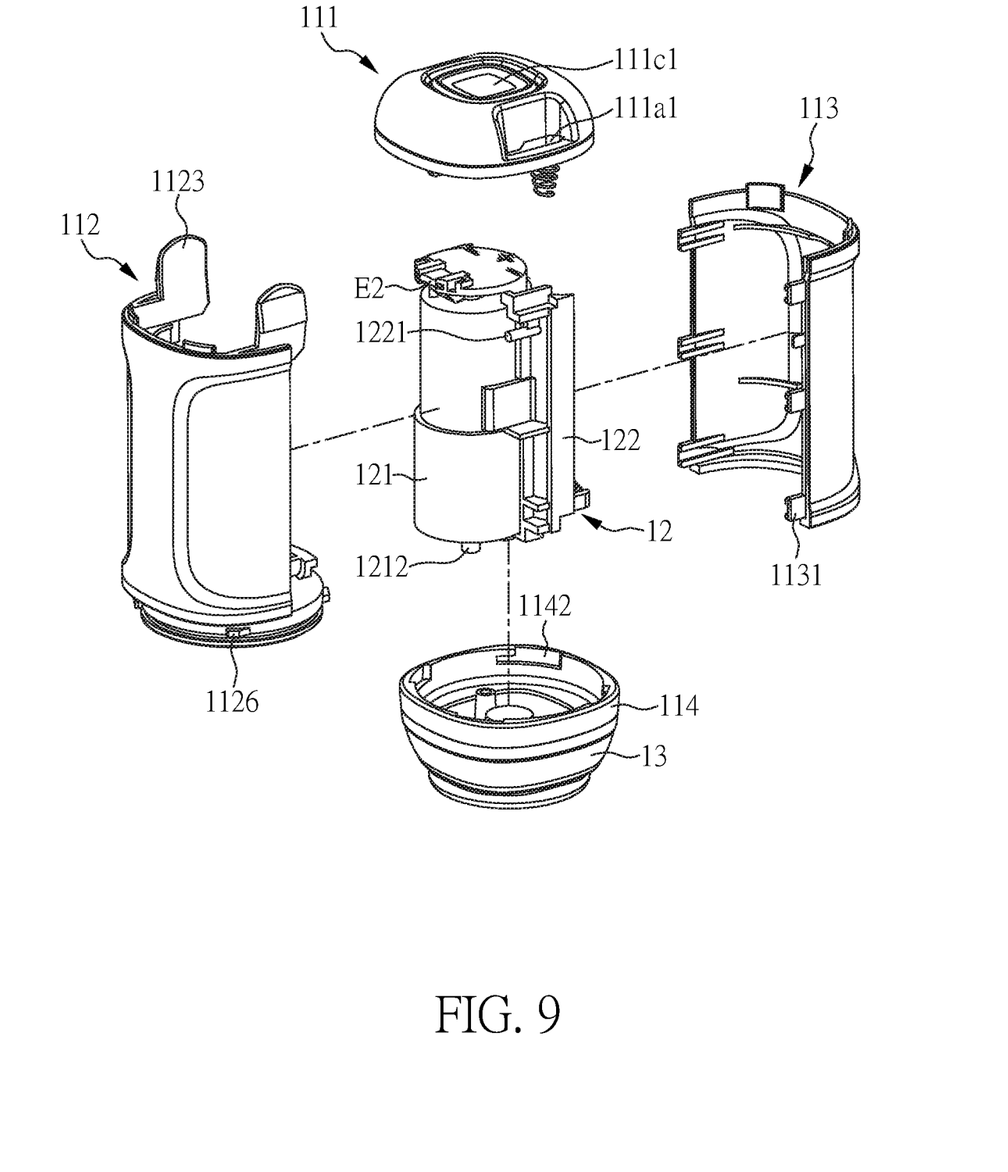
FIG. 9 is a top assembly view of the portable air extracting device according to the second embodiment of the present invention.
Figure 10:
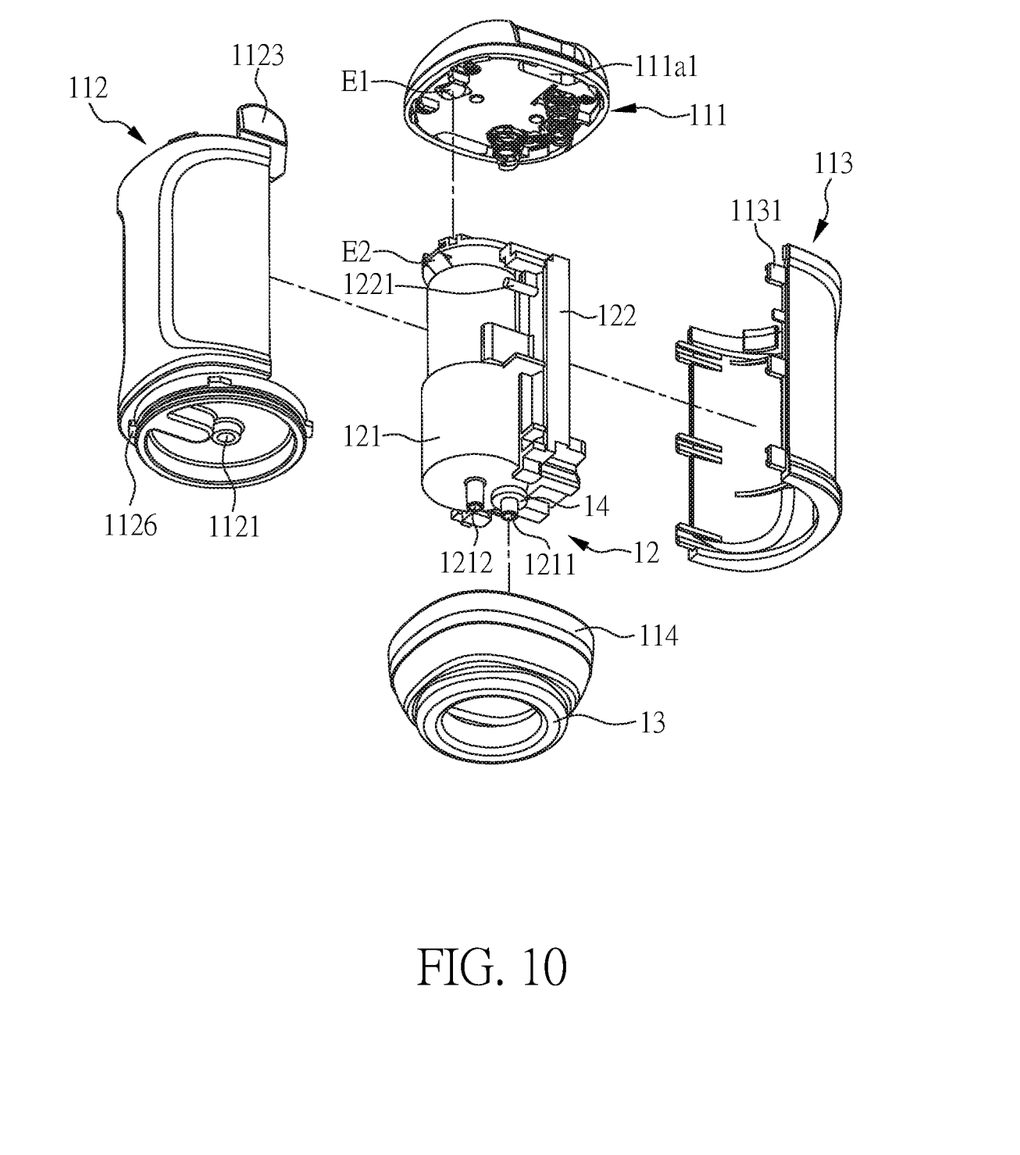
FIG. 10 is a bottom assembly view of the portable air extracting device according to the second embodiment of the present invention.

FIGS. 9 and 10 illustrate the assembly of the portable air extracting device of the present invention.

First, the intake nozzle 1211 of the electric air extracting pump 121 is inserted into the internal air-extracting hole 1121 of the spacer 1120 of the first side shell 112. The protrusion 1221 of the electric cell support 122 is inserted into the second slot 1125 of the first side shell 112. Thus, the air extracting module 12 is fixed on one side of the first side shell 112.

Then, the six bolts 1131 of the second side shell 112 are inserted into the six first slots 1124 of the first side shell 112. The two first tongues 1123 of the first side shell 112 are bucked into the two grooves 111a1 of the top shell 111, and the four second tongues 1126 of the first side shell 112 are buckled into the four snap-fit grooves 1142. In this way, the assembly of the portable air extracting device of the present invention is accomplished. It is appreciated that no hand tool is required for the assembly of the portable air extracting device of the present invention and it is very convenient to assemble it.

(Maintenance)

FIGS. 9 and 10 illustrate the maintenance of the portable air extracting device of the present invention.

When the user wants to replace the electric cells 16 on the electric cell support 122, he can just press the two first tongue 1123 to remove the top shell 111, and then he can replace the electric cells 16. When the user wants to clean up the steam or foreign matters accumulated in the intake room S1 of the bottom shell 114, he can just rotate the bottom shell 114 to remove it, and then he can clean up the intake room S1. Therefore, it is very convenient to maintain the portable air extracting device of the present invention.

In conclusion, the portable air extracting device of the present invention is durable, good for heat dissipation, easy for disassembly and maintenance and convenient for use.

The terms "top" "down", "left", "right", "front" and "back" in the previous description is used only for the purpose to explain the relative locations of aforementioned elements. Other numbers of the aforementioned elements may be chosen in practical application.

Although the present invention has been explained in relation to its preferred embodiment, it is to be understood that many other possible modifications and variations can be made without departing from the spirit and scope of the invention as hereinafter claimed.

What is claimed is:

1. A portable air extracting device, comprising:
   a shell assembly including a top shell, a side shell and a bottom shell surrounding a fluid room; the shell assembly further including a spacer dividing the fluid room into an intake room and an outtake room; the bottom shell being provided with an external air-extracting hole; the external air-extracting hole connecting the intake room to a target space to be evacuated;
   a suction element detachably arranged on the bottom shell and made of flexible materials; and
   an electric air extracting pump including an intake nozzle connected to the intake room and an outtake nozzle connected to the outtake room;
   wherein the intake nozzle is misaligned with the external air-extracting hole;
   wherein the outtake room surrounds the entire electric air extracting pump, and air flowing out of the outtake nozzle into the outtake room diffuses, flows or circulates in the outtake room.

2. The portable air extracting device as claimed in claim 1, wherein
   the intake nozzle has an intake nozzle channel;
   the external air-extracting hole has an external air-extracting hole channel; and
   there is no imaginary line passing through both of the intake nozzle channel and the air extraction hole channel.

3. The portable air extracting device as claimed in claim 1, wherein the intake nozzle is aligned with a center point of the bottom shell, while the external air-extracting hole is misaligned with the center point of the bottom shell.

4. The portable air extracting device as claimed in claim 1, wherein the external air-extracting hole is aligned with a center point of the bottom shell, while the intake nozzle is misaligned with the center point of the bottom shell.

5. The portable air extracting device as claimed in claim 1, wherein the spacer further includes an internal air-extracting hole connecting the intake nozzle to the intake room.

6. The portable air extracting device as claimed in claim 5, further comprising an internal airtight element arranged between the spacer and the intake nozzle.

7. The portable air extracting device as claimed in claim 6, wherein the internal airtight element is hitched on the intake nozzle.

8. The portable air extracting device as claimed in claim 5, further comprising an external airtight element arranged between the spacer and the bottom shell.

9. The portable air extracting device as claimed in claim 5, wherein the side shell includes a first side shell and a second side shell.

10. The portable air extracting device as claimed in claim 9, wherein the spacer is integrated with the first side shell.

11. The portable air extracting device as claimed in claim 9, wherein the spacer is integrated with the second side shell.

12. The portable air extracting device as claimed in claim 1, wherein the spacer includes an air buffer room connected to the outtake room, and the outtake nozzle is aligned with the air buffer room.

* * * * *